Patented Nov. 19, 1940

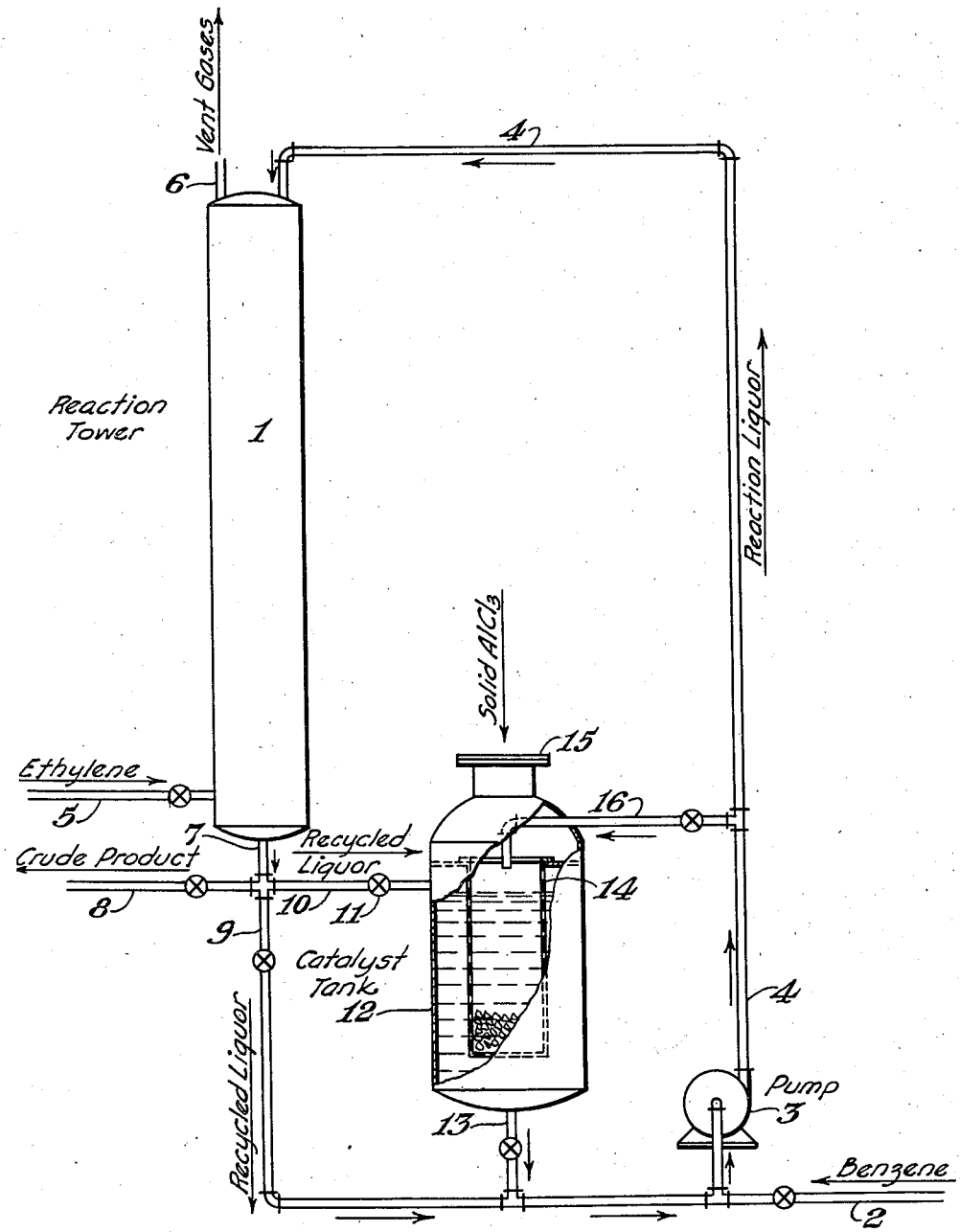

2,222,012

UNITED STATES PATENT OFFICE 2,222,012

ALKYLATION OF AROMATIC COMPOUNDS

James L. Amos and Jack L. Williams, Midland, Mich., and Henry S. Winnicki, Potsdam, N. Y., assignors to The Dow Chemical Company, Midland, Mich., a corporation of Michigan Application April 12, 1938, Serial No. 201,646

4 Claims. (Cl. 260—671)

The present invention concerns an improved process for continuously reacting an alkylating agent with an aromatic compound in the presence of a Friedel-Crafts catalyst. It comprises novel procedure for continuously forming the organo-metal halide complex catalyst for use in such reactions.

It is well understood that in the Friedel-Crafts reaction, i. e. in the reaction of alkylating agents such as olefines and alkyl halides with aromatic compounds in the presence of a metal halide, the active catalytic agent is not the solid metal halide itself, but rather is a complex organo-metal halide substance comprising the metal halide and aromatic compound and probably also comprising alkylated aromatic compound and hydrohalic acid. For example, in the condensation of ethylene with benzene in the presence of aluminum chloride, the active catalyst is a partially soluble brown sludge-like material which has been suggested to have a composition corresponding approximately to one of the formulas

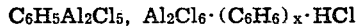

or

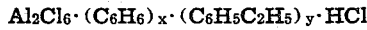

wherein $x$ and $y$ are integers.

In carrying out Friedel-Crafts syntheses it has been customary to suspend the solid metal halide in the aromatic compound or solution thereof and then gradually introduce the alkylating agent into the suspension. In such process the solid metal halide first slowly reacts to form a partially soluble organo-metal halide complex catalyst of the type described above and this latter material then promotes the desired reaction. This procedure is disadvantageous in that the concentration and the activity of the actual catalyst are not constant but change as long as the solid metal halide continues to form organo-metal halide complex and in that the activity of the catalyst can never be precisely controlled. Because of such disadvantages, this customary mode of forming the organo-metallic complex catalyst is unsatisfactory when applied to a continuous alkylation process.

An object of the present invention is to provide a simple and effective procedure for continuously forming an organo-metal halide complex catalyst of the Friedel-Crafts type. Another object is to provide a process for carrying out a Friedel-Crafts alkylation wherein the concentration of the catalyst may readily be controlled and the activity of the catalyst easily maintained at a maximum. Other objects will be apparent from the following discussion.

The continuous preparation of an alkylated aromatic compound is preferably carried out by contacting an alkylating agent with a reaction liquor comprising an aromatic compound and an organo-metal halide complex of the Friedel-Crafts type whereby a crude alkylated product is formed, withdrawing only a portion of said crude product, and recycling the remainder thereof into subsequent contact with additional alkylating agent. In such process we have found that the complex catalyst may be maintained at maximum activity and fresh catalyst may easily be formed in continuous manner by contacting at least a portion of the liquor being recycled with a bed of the solid metal halide corresponding to the organo-metal halide complex catalyst. The invention, then, consists in the process hereinafter explained and more particularly pointed out in the claims, the annexed drawing and following description setting forth but several of the ways in which the principle of the invention may be employed.

In said drawing the single figure illustrates diagrammatically one arrangement of apparatus adapted to be used in accordance with the invention.

For purpose of illustration the process will be described with respect to the reaction of ethylene with benzene in the presence of an aluminum chloride complex catalyst, although it will be understood that the method is generally applicable to Friedel-Crafts alkylations. Referring to the drawing, the reaction of ethylene with benzene occurs in tower 1, which may be filled with packing, or other means of contacting the ethylene gas and the reaction liquor. Benzene enters the system through line 2 and mixes with recycled liquors from line 9, as will be hereinafter explained. The mixed liquor thus formed is forced by pump 3 through line 4 to the top of tower 1. In said tower the liquor flows downwardly and reacts with an ascending stream of ethylene introduced through line 5 whereby ethyl benzene is formed. Unreacted gases pass off through vent 6. The crude reaction product formed in tower 1 is removed through outlet 7 to which branch lines 8, 9 and 10 are connected. A portion of the crude product is withdrawn through line 8, and is treated by usual procedures in apparatus not shown to separate the catalyst and to purify the ethyl benzene, e. g. by fractional distillation. The remainder of the reaction liquor leaving tower 1 through outlet 7 is recycled to the top of tower 1, either directly by line 9, pump 3, and line 4, or indirectly through line 10, tank 12, outlet 13, line 9, pump 3, and line 4.

The partially spent organo-metal halide complex reaction catalyst in the recycled liquor is reactivated and fresh alkylation catalyst is formed continuously in tank 12, in which is suspended a wire screen basket 14 containing solid aluminum chloride. The recycled reaction liquor containing benzene, ethyl benzene, some polyethyl benzenes and some hydrogen chloride, in addition to the partially spent organo-metal halide complex catalyst, enters through line 10. By regulation of valve 11 the liquid level in tank 12 is maintained at such a height that the solid aluminum chloride in basket 14 is largely immersed and thus reacts with the surrounding liquor to reactivate the partially spent catalyst in such liquor and also to form fresh organo-metallic complex catalyst. The aluminum chloride in basket 14 may be replenished from time to time as needed by removing cover plate 15 and dropping in additional solid material. If it is desired to form fresh catalyst rapidly, part of the reaction liquor in line 4 may be bled off through line 16 to the inside of basket 14, thus producing a powerful washing action which increases the rate of catalyst formation.

It will be understood that the process of the present invention is not limited by the apparatus shown. Thus, the alkylation need not be conducted in a tower as shown in the drawing but may be carried out in any suitable means for contacting the alkylating agent and reaction liquor either in parallel or counter-current flow. Likewise, the continuous formation of the organo-metallic complex catalyst may be carried out in any other convenient means for contacting the recycled reaction liquor with a body of solid metal halide, instead of in tank 12 as shown. Also the fresh benzene entering the reaction system may be introduced into the recycled liquor at any point before the liquor enters the reaction tower. Other such minor variations in the apparatus which may at times be desirable, depending upon the particular alkylation being carried out, will doubtless occur to one skilled in the art.

An important advantage of the present process is the ease with which the concentration of organo-metal halide complex catalyst may be controlled. Thus if a low concentration is desired, most of the reaction liquor to be recycled may be directed through line 9, whereas if a high concentration is needed, the reaction liquor may be recycled largely through catalyst tank 12, more catalyst thereby being formed. Because of this positive control of the catalyst concentration, alkylation according to the present invention may be carried out at maximum efficiency.

Our new method also permits continuous formation of fresh catalyst under the most favorable conditions. It has long been known that a Friedel-Crafts catalyst is formed more rapidly and is of higher activity when hydrogen halide and alkylated aromatic compound are present at the time of formation. In the present process the recycled liquor contains not only alkyl aromatic compounds but also hydrogen halide formed by decomposition of the metal halide complex, and thus favors formation of highly active catalyst. Further, the exposure of recycled reaction liquor to a body of solid metal halide not only serves to form fresh catalyst which replenishes the catalyst withdrawn from the system with the crude product, but also tends to reactivate the partially spent sludge-like catalyst suspended in the recycled liquor. Accordingly the entire alkylation is carried out at all times in the presence of highly active catalyst and thus is extremely efficient.

The present process is particularly advantageous when an olefin is employed as the alkylating agent. In such alkylations the catalyst employed not only promotes alkylation but also tends to induce polymerization of the olefin with consequent formation of tarry materials which markedly decrease the efficiency of reaction. Such tendency toward polymerization is greatly enhanced in usual alkylation processes by the unavoidable presence in the reaction mixture of unreacted solid metal halide during the early stages of the reaction before the organo-metal halide complex is entirely formed. In our new process, however, no solid metal halide particles are present in the reaction liquor when it is contacted with the alkylating agent, and polymerization of an olefin reactant is thus substantially avoided.

Although the present method is especially suitable for reacting gaseous olefins with aromatic hydrocarbons in the presence of an aluminum chloride catalyst, it will be appreciated that it may be applied to Friedel-Crafts alkylations of all types. Thus any alkylating agent capable of reacting with an aromatic compound in the Friedel-Crafts reaction, e. g. olefins and alkyl halides, both gaseous and liquid, may be employed. The method is likewise applicable to any aromatic compound, e. g. hydrocarbons, halo-hydrocarbons, ethers, etc., which may be alkylated in the presence of a Friedel-Crafts catalyst. If the compound to be alkylated is a solid, it may be dissolved in any suitable inert solvent. Metal halide catalysts other than aluminum chloride, e. g. ferric chloride, zinc chloride, etc., may of course be employed.

Other modes of applying the principle of our invention may be employed instead of the one explained, change being made as regards the details herein disclosed, provided the step or steps stated by any of the following claims or the equivalent of such stated step or steps be employed.

We therefore particularly point out and distinctly claim as our invention:

1. In a process for the preparation of alkylated aromatic compounds wherein an alkylating agent is contacted with a liquor comprising an aromatic compound capable of being alkylated and an organo-metal halide catalyst of the Friedel-Crafts type, during which operation alkylated compounds are formed and the catalyst tends to become de-activated, and wherein at least a portion of the reaction liquor resulting from said operation containing both alkylated compounds and catalyst is recirculated into contact with additional alkylating agent, the step of revivifying and replenishing the catalyst contained in the said reaction liquor being recirculated which comprises contacting at least part of the said liquor with a body of the solid metal halide corresponding to the organo-metal halide catalyst, whereby the catalyst is reactivated while in the presence of reaction liquor containing alkylated compounds.

2. In a process for the preparation of alkylated aromatic hydrocarbons wherein a gaseous alkylating agent is contacted with a liquor comprising an aromatic hydrocarbon capable of being alkylated and an organo-metal halide catalyst of the Friedel-Crafts type, during which operation alkylated hydrocarbons are formed and the catalyst tends to become de-activated, and wherein at least a portion of the reaction liquor resulting from said operation containing both alkylated hydrocarbons and catalyst is recirculated into contact with additional alkylating agent, the step of revivifying and replenishing the catalyst contained in the said reaction liquor being recirculated which comprises contacting at least part of the said liquor with a body of the solid metal halide corresponding to the organo-metal halide catalyst, whereby the catalyst is reactivated while in the presence of reaction liquor containing alkylated hydrocarbons.

3. In a process for the preparation of ethyl benzene wherein ethylene is contacted with a liquor comprising benzene and an organo-aluminum chloride complex catalyst of the Friedel-Crafts type, during which operation ethylated benzenes are formed and the catalyst tends to become de-activated, and wherein at least a portion of the reaction liquor resulting from said operation containing both ethylated benzenes and catalyst is recirculated into contact with additional ethylene, the step of revivifying and replenishing the catalyst contained in the said reaction liquor being recirculated which comprises contacting at least part of the said liquor with a body of solid aluminum chloride, whereby the catalyst is reactivated while in the presence of reaction liquor containing ethylated benzenes.

4. In a process for the reaction of an alkylating agent with an aromatic compound capable of being alkylated in the presence of an organo-metal halide catalyst of the Friedel-Crafts type, the steps which comprise: reacting the alkylating agent with a liquor comprising said aromatic compound and said catalyst, whereby alkylated compound is formed and the catalyst tends to become partially spent; withdrawing at least a portion of the reacted liquor containing alkylated compounds and said partially spent catalyst; contacting at least part of the portion withdrawn with a body of the solid metal halide corresponding to the organo-metal halide complex catalyst, whereby the said catalyst is reactivated while in the presence of reaction liquor containing alkylated compounds; and thereafter returning the entire portion withdrawn to the alkylation step.

JAMES L. AMOS.
JACK L. WILLIAMS.
HENRY S. WINNICKI.